United States Patent [19]

Claassen et al.

[11] Patent Number: 4,487,623
[45] Date of Patent: Dec. 11, 1984

[54] METHOD OF AND APPARATUS FOR REMOVING SHARPLY BENT GLASS SHEETS FROM PRESS BENDING MOLDS

[75] Inventors: George R. Claassen, New Kensington; John J. Ewing, Tarentum, both of Pa.

[73] Assignee: PPG Industries, Inc., Pittsburgh, Pa.

[21] Appl. No.: 514,393

[22] Filed: Jul. 18, 1983

[51] Int. Cl.³ .......................................... C03B 23/035
[52] U.S. Cl. ...................................... 65/106; 65/104; 65/273; 65/287
[58] Field of Search ................. 65/104, 106, 107, 273, 65/287

[56] References Cited

U.S. PATENT DOCUMENTS

| 2,817,928 | 12/1957 | Lambert et al. | 65/106 |
| 3,341,313 | 9/1967 | Wheeler et al. | 65/104 |
| 3,367,764 | 2/1968 | Seymour | 65/291 |
| 3,737,297 | 6/1973 | Frank | 65/273 |
| 4,119,425 | 10/1978 | Marriott | 65/104 X |
| 4,204,854 | 5/1980 | McMaster et al. | 65/106 |

FOREIGN PATENT DOCUMENTS 1316685 12/1962 France .

Primary Examiner—Arthur Kellogg
Attorney, Agent, or Firm—Andrew C. Siminerio; Edward I. Mates

[57] ABSTRACT

Vacuum is applied to help separate a press bent glass sheet from between a pair of complementary press bending molds during the separation of said molds after completing said press bending.

12 Claims, 2 Drawing Figures

METHOD OF AND APPARATUS FOR REMOVING SHARPLY BENT GLASS SHEETS FROM PRESS BENDING MOLDS

BACKGROUND OF THE INVENTION

The present invention relates to the shaping of glass sheets, and particularly to the shaping of glass sheets to relatively deep shapes by press bending and especially to glass sheets that have a coated surface portion defining either a decorative area or an electroconductive heating circuit or an opaque covering over a marginal area where an automobile window is bonded to an automobile frame.

The use of bent glass sheets has increased in recent years. Automobiles are provided with one piece bent windshields and also with one piece bent and tempered rear windows. In recent years, rear windows (also termed backlights) have been provided with heating circuits of electroconductive material applied to the inner surface of the rear window that help remove frost and ice deposits on the window by subjecting the circuit to an electrical voltage.

To fabricate bent and tempered glass sheets for certain patterns of continuous rear windows of automobiles or as one of the components of a laminated windshield, glass sheets are supported in a vertical or oblique position, either by suspending the glass from tongs or supporting the glass along its bottom edge and balancing the glass sheet either by mechanical balancing means near its upper edge in a near vertical orientation or by fluid or gas directed against or parallel to one or more major surfaces of an oblique glass sheet.

The glass sheets are shaped to the desired shape by press bending a sheet after it has been heated to a temperature sufficient for the glass to deform readily. After a glass sheet is shaped, it is removed from a shaping station and transported into a cooling station where the glass sheet is chilled in a cold tempering medium such as blasts of cold air applied against the opposite major surfaces of the glass sheet to cool the glass sheet at a cooling rate sufficient to impart a desired degree of temper in the glass sheet.

TECHNICAL BACKGROUND AND PATENTS OF INTEREST

When glass sheets are press bent to shapes of complicated curvature, they are sandwiched while hot between press bending molds shaped to complementary curvatures and conforming to the shape desired for the glass sheet after bending. When glass sheets are bent sharply, or bent to complicated curvatures, several difficulties occur due to the fact that the glass sheet, after bending, tends to stick to the press bending mold that has a convex shaping element which imparts a concave shaping element to the heat softened bent glass sheet. The two press bending molds are moved relative to one another with the deformable glass sheet either suspended or supported therebetween and held for sufficient time to impart the shape required in the glass. When the press bending molds are separated from one another after the shape has been imparted to the heat softened glass sheet, the sheet tends to stick to the press bending mold having a convex shaping element. The reason for this sticking is believed to be caused by the fact that air in the shaping station cannot enter between the sheet and the convex shaping element quickly enough when the press bending molds are separated in order to separate the bent glass sheet from the convex shaping element of one of the press bending molds. The absence of air between the sheet and the convex press bending mold causes a high tensile strain in the glass which may be a cause of breakage if the glass has been vented prior to its shaping by press bending.

If mechanical force in the form of a prying tool is interposed between the mold and the bent glass to separate the glass sheet from the press bending mold having a convex shaping element, there is danger of deforming the glass sheet because the glass sheet is still soft enough to be deformed when the molds are separated from one another.

It has been proposed in French Pat. No. 1,316,685 to Companie de Saint-Gobain to apply air or other gaseous fluid under pressure to penetrate between the shaped glass sheet and the press bending mold having a convex shaping element at the moment or immediately before the moment of separation between the press bending molds following a shaping operation.

In the Saint-Gobain patent, pressurized air is introduced through a number of small openings extending through the shaping wall of the convex press bending mold toward the concavely shaped glass sheet surface. The air can be applied toward a selected zone of the glass sheet or toward several desired zones or toward zones that include the entire surface of the glass sheet. If the air blasts are introduced at the moment of separation, after bending has been achieved, they may be applied in the form of pulsations in order to cause a series of vibrations which help release the bent glass sheet from the shaping surface of the press bending mold without creating too great a deformation of the glass sheet. However, it has been determined that because the glass sheet must be soft at the start of the subsequent cooling step that causes the imposition of a temper in the bent sheet, that strong air blasts applied under positive pressure through apertures cause the surface of the glass sheet to replicate the pattern of apertures through which the air blasts are applied.

Quite frequently in more recently fabricated automobile backlights, a continuous pattern of an opaque decorative coating and/or a configurated pattern of an electroconductive frit coating is applied to the concave glass sheet surface to impart either a decorative effect or a heating circuit for eliminating frost or dew. Applying a spurt or succession of spurts of air blasts against a coated surface of a hot glass sheet that is newly shaped would cause the pattern of the heat softened coating to be disrupted in the regions of the application of the air blasts.

Since it is convenient to apply the heating circuit to the inner surface of the rear window of an automobile so as to minimize the exposure of the frit composition to the outside atmosphere and also to devices and detergents that wash the automobile exterior periodically, the glass surface that develops a concave curvature during shaping is provided with the coating that would be subject to disfigurement due to the air blasts applied while trying to separate the bent glass sheet from the separating press bending molds in the manner taught by the aforementioned Saint-Gobain patent.

It was important for the glass sheet shaping art to develop a technique that would avoid disfigurement of a coating whether it be an opaque or translucent design coating useful for decorative purposes, or an opaque border coating used to mask any attachment elements between the backlight and the frame in which the backlight is mounted by a flush glazing technique which is presently popular, or a coating of a pattern of electroconductive elements of a heating circuit which would be marred and would develop inferior electroconductive properties in the vicinity of each marred region due to the application of air blasts either continuously or intermittently during the separation of the localized surface portion of concavely shaped configuration from the separating press bending molds.

It would also be desirable to avoid the overall appearance of dots in polarized light that appear in reflection over an entire bent and tempered window when the entire press bending mold with a shaping surface having a convexly shaped portion is furnished with apertures for the application of air blasts to help separate the bent glass sheet from between the press bending molds after a press bending operation has been completed.

BRIEF DESCRIPTION OF THE PRESENT INVENTION

According to the present invention, the press bending mold having a concave shaping element that produces a convex shaping element of a bent glass sheet is provided with one or more apertured vacuum chambers through which vacuum is applied to apply a light suction force during the moment of separation of the press bending molds from the opposite major surfaces of a newly press bent glass sheet. Such modest suction does not have any deleterious effect upon either the shape of the glass sheet that has been just bent and does not affect the continuity of any electroconductive lines of electroconductive frit that are applied to the concave surface of the glass sheet or impair other coatings that may degrade when positive blasts of air or other fluid are applied against the concave surface of the glass through openings in the convex press bending mold. These and other benefits of the present invention will be observed in the light of a description of a preferred embodiment of the present invention that follows.

BRIEF DESCRIPTION OF THE DRAWINGS

In the drawings that form part of an apparatus conforming to the present invention.

BRIEF DESCRIPTION OF PREFERRED EMBODIMENT

Figure 1:
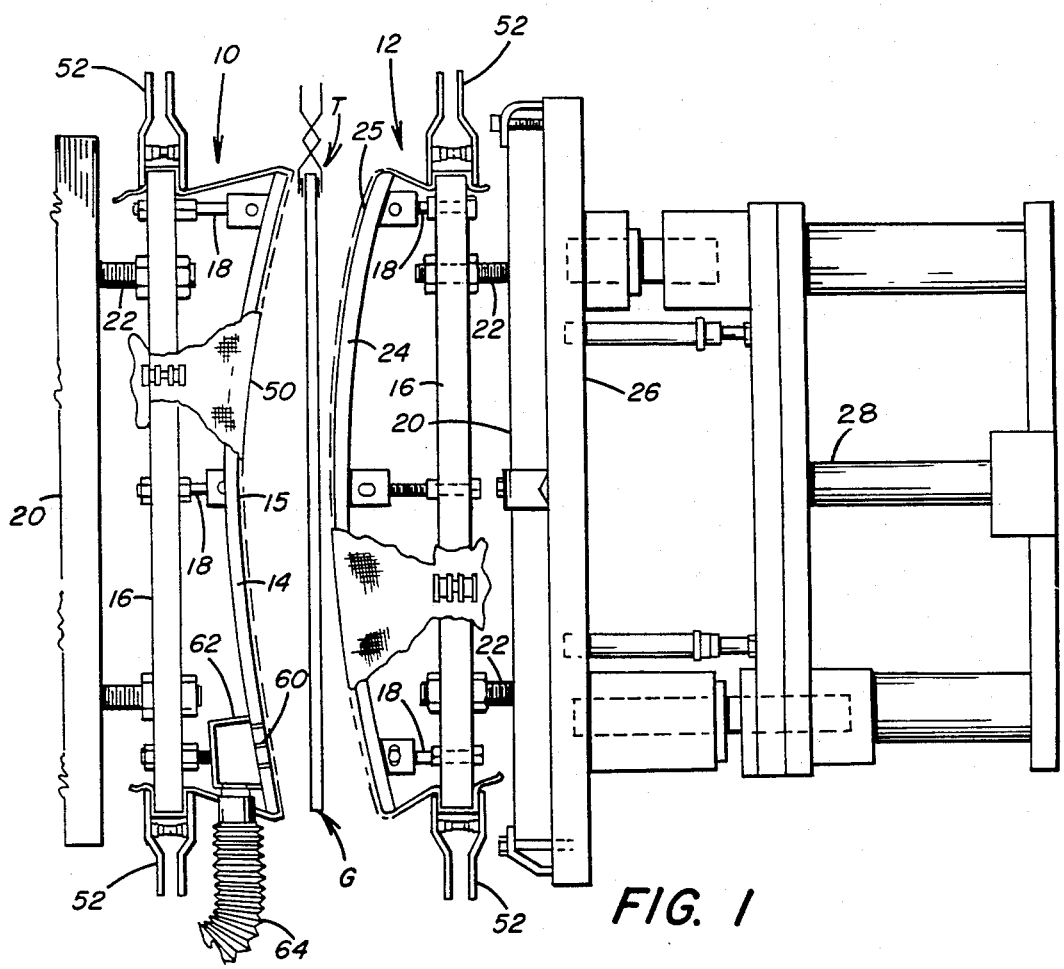
FIG. 1 is an end view of a typical press bending apparatus modified according to the present invention for press bending a glass sheet vertically suspended by tongs to a shape about an essentially horizontally extending bending axis.

FIG. 1 indicates how a pair of press bending molds of the type depicted in U.S. Pat. No. 3,367,764 to Samuel L. Seymour is modified according to one embodiment of the present invention in which glass sheets are conveyed into a glass sheet shaping station while suspended from tongs. The present invention may also be used in glass sheet press bending apparatus of the type depicted in U.S. Pat. No. 3,737,297 to Robert G. Frank in which glass sheets are supported along their lower edge for movement into a shaping station and are balanced in an oblique orientation by flows of fluid as they are conveyed through a heating furnace and into a shaping station or are balanced by hairpins along their upper edges as in U.S. Pat. No. 2,263,005 to Donald L. McClure or are balanced by oblique upward flows of fluid applied essentially normal to the lower major surface of the glass sheet as in U.S. Pat. No. 3,630,706 to Waldemar W. Oelke et al.

Referring to the drawings, and particularly FIG. 1, a pair of press bending molds comprising a concave press bending mold 10 and a convex press bending mold 12 of complementary curvature are disclosed in spaced relation on opposite sides of a glass sheet G suspended from a pair of tongs T. Molds of this type are similar to apparatus shown and described in U.S. Pat. No. 3,367,764 to Samuel L. Seymour, the details of which are incorporated by reference in this specification. This disclosure will only describe the apparatus sufficiently to furnish an environment for the modification proposed by the present invention.

As seen in FIG. 1, the concave press bending mold 10 comprises a relatively flexible shaping plate 14 having a concave shaping surface 15 facing forward in one direction to face a position occupied by a glass sheet G suspended from a plurality of tongs T. A relatively rigid member in the form of a metal plate 16 is disposed in spaced relation behind the shaping plate 14 by means of a series of clevis-type attachment means 18 distributed throughout the extent of the plates. The attachment means are constructed and arranged in the manner described in U.S. Pat. No. 3,367,764 to be adjustable in length and to have a jointed structure so as to provide local changes in the shape of the flexible shaping plate 14 without disturbing the shape of the relatively rigid member 16. A rigid back plate 20 is attached through elongated connectors 22 to the rear of the rigid member 16. Notches 23 (FIG. 2) are provided along the upper edge of the flexible shaping plate 14 to receive tongs T from which the glass sheet G is suspended during a press bending operation. The concave press bending mold 10 is connected to a piston to provide relative movement toward and away from a shaping position that a glass sheet G occupies between the molds for a press bending operation. The structure of the actuating piston is similar to that of a piston to be described for actuating movement of the convex press bending mold 12.

The convex press bending mold 12 comprises a relatively flexible shaping plate 24 having a generally convex shaping surface 25 facing outwardly therefrom toward the position occupied by the glass sheet G when the latter is in a position to be shaped at a shaping station. The convex shaping surface 25 is essentially complementary to the concave shaping surface 15. The flexible shaping plate 24 is connected to a rigid member 16 through clevis-type attachment means 18 constructed in a manner similar to those provided for the concave press bending mold 10 for serving an identical purpose for the convex press bending mold 12. Additional elongated connectors 22 are provided to attach the rigid member 16 to a rigid back plate 20 that is spaced behind the rigid member 16 in a relation that forms an approximate mirror image of the arrangement provided for the corresponding rigid member 16 and rigid back plate 20 of the concave press bending mold 10.

The rigid back plate 20 of the convex press bending mold 12 is shown attached to a piston plate 26. The latter is flexibly connected to the forward end of a piston ram 28 to enable the convex press bending mold 12 to move relative to the thickness of the glass sheet G. A similar piston arrangement (not shown) is provided for the concave press bending mold 10. The pair of piston arrangements move the opposite press bending molds according to a desired cycle of movement against the opposite major surfaces of the supported glass sheet to sandwich the heat-softened glass sheet therebetween and then to release the latter.

Each flexible shaping plate 14 and 24 is covered with a suitable cover 50 of flexible refractory material such as one or more layers of knit fiber glass cloth. The covers are held in tight relation against the shaping surfaces 15 and 25 by clamps 52. The covers 50 are preferably made of one or more layers of knit fiber glass cloth composed of textured yarn conforming to the covers whose use is described and claimed in U.S. Pat. No. 3,148,968 to Cypher and Valchar, the details of which are incorporated herein by reference.

According to the modification of the prior art press bending apparatus contained in an illustrative embodiment of this invention, one or more areas of the flexible plate 14 of the concave press bending mold are provided with a plurality of apertures 60. These apertures communicate with vacuum boxes 62 which are connected through flexible feed pipes 64 to a source of vacuum (not shown).

A valve (not shown) is included in the vacuum line to control the application of vacuum. Operation of the valve is synchronized with the cycle of movement of the press bending molds 10 and 12 to insure that suction is applied through apertures 60 in desired timing synchronism with the beginning of the separation of the press bending molds 10 and 12 from one another at the end of a press bending cycle.

In a conventional press bending operation, a flat glass sheet is conveyed through a tunnel-type heating furnace while supported either by tongs T as disclosed in FIG. 1 or supported along its bottom edge and balanced either by gas flows along or against its opposite major surfaces in an essentially vertical plane or in a near vertical or oblique orientation by gas support against the lower major surface or supported by balancing members that engage the glass sheet along its top edge portion while the bottom edge of the glass is supported. The glass sheet, on attaining the requisite temperature at which it readily deforms, moves out of the heating furnace and into position between the press bending molds 10 and 12 while the latter are in their separated position as depicted in FIG. 1. The molds are then moved against the opposite surfaces of the heat-softened glass sheet G to impress their complementary shapes onto the glass sheet. The molds are separated and the press bent glass sheet is then conveyed into a cooling area where a tempering medium, preferably air blasts, is applied toward the opposite major surfaces of the press bent glass sheet to achieve a rapid cooling of the glass at a rate sufficient to establish the desired degree of temper. The tempering aspect of this commercial operation is well-known in the art and need not be further described herein.

When the glass sheet has been shaped to conform to the configuration desired for the bent glass sheet, the latter, being heat-softened, tends to stick against the convex surface 25 of the convex press bending mold 12.

If the press bent glass sheet is separated by immediately blowing air or other fluid through the convex mold 12 against the stuck concave surface of the bent glass sheet, the heat-softened glass sheet tends to develop dimples at the points of application of the fluid applied to separate the glass sheet from the convex shaping surface. Furthermore, the relatively cool air used to help separate the press bent sheet from the convex mold cools the glass sheet locally prior to the temper imparting cooling step and thus limits the maximum temper that can be developed in the press bent glass sheet. However, according to the modification provided by the present invention, a gentle vacuum is applied through the apertures 60 to overcome the tendency of the glass sheet to hug the convex shaping surface 25 of the convex press bending mold without imparting the indentations that resulted from the use of the apparatus patented by Saint-Gobain.

It is required that certain shaped rear windows for automobiles be provided with a peripheral frame of dark paint to hide certain installation devices. The blasts tend to distort the areas of the paint and leave a sloppy appearance. Furthermore, in cases where the rear window has an electroconductive heating circuit applied to a major surface that faces the convex surface of the convex press bending mold during press bending, the electroconductive ceramic frit which provides the electroconductive heating circuit on the concavely shaped major surface of the bent glass sheet becomes disrupted in the zones of fluid application to form regions of high resistivity which deleteriously affect the operation of the heating circuit.

While it is possible to use apertures 60 having a diameter as large as 3/16 inch (4.8 millimeters) when a double layer of knit fiber glass cloth of the type depicted in the Cypher and Valchar patent mentioned previously is used, it has been found suitable to use apertures 60 in three or more small, unique areas, each communicating with a vacuum box 62. Three rows of apertures 60 having a diameter of 1/8 inch (3.2 millimeters) separated by approximately one inch (2.54 centimeters) center to center along each row and from row to row has been found suitable for helping remove press bent glass sheets conforming to a commercial automobile rear window 15 inches high by 57 inches long (approximately 38 centimeters high by 145 centimeters long). Other sizes of bent glass sheets in various thicknesses ranging from approximately 1/8 inch (3 millimeters) to approximately 1/4 inch (6 millimeters) and thicker are released from press bending molds more efficiently without dimpling the glass or harming any coating on a major surface thereof to the extent of having the resulting press bent window rejected by a customer.

Care must be taken to insure that the onset of the vacuum occurs approximately simultaneously with the beginning of the separation of the press bending molds from one another. If the onset of the vacuum is delayed, the glass sheet may pivot from its support orientation and maintain a hugging relation to the convex press bending mold. If the vacuum is started prematurely, the beneficial effects of avoiding the dimpling of the glass that occurs when a positive pressure is applied against the concave major surface is reduced somewhat. Best results are obtained when the application of vacuum through the vacuum boxes is approximately simultaneous with or less than one second before the beginning of the retraction of the press bending molds 10 and 12 with respect to one another.

Figure 2:
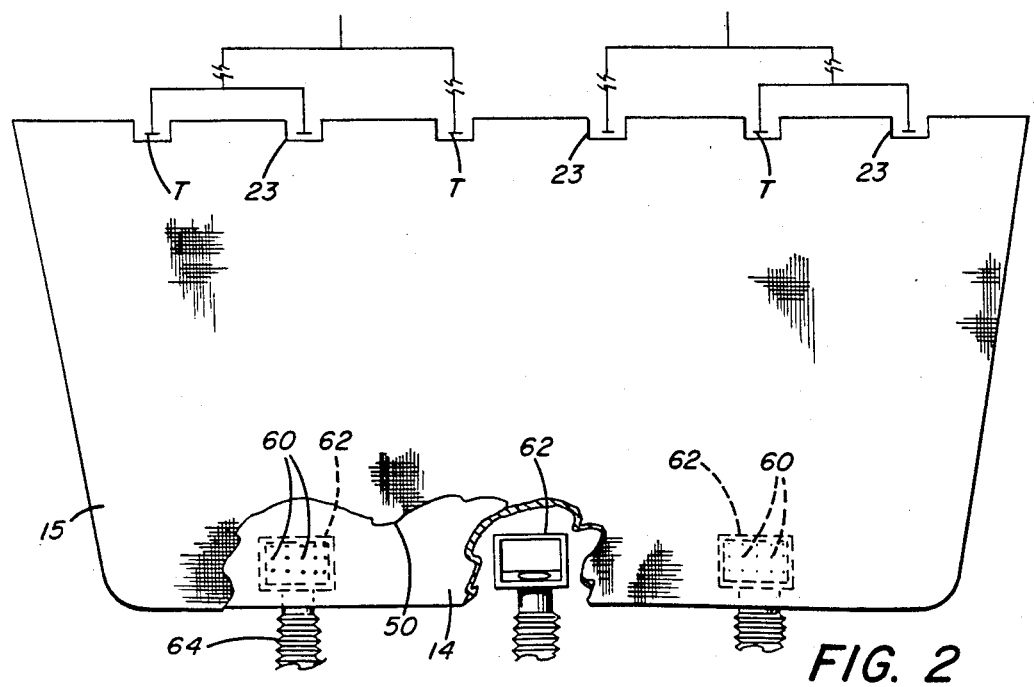
FIG. 2 is a front elevational view of the front portion of one of a pair of press bending molds for shaping a glass sheet vertically suspended by tongs into a typical backlight bend comprising a pair of longitudinal end portions bent sharply about essentially vertical or near vertical axes of bending relative to a flat or shallowly bent main portion.

It is understood that glass sheets can be press bent about either an axis that extends horizontally as is the case for side light shaping mold seen in FIG. 1 or about spaced axes that extend essentially vertically as in the case of the backlight shaping mold seen in FIG. 2 or to complex or compound bends that include one or more inwardly curved portions that would tend to hug a convexly curved portion of a press bending mold during the separation of the press bending molds, and beneficial results occur using the teachings of the present invention.

It is not necessary that the arrays of apertures through which vacuum is applied to be located in several spaced areas. For exceedingly large parts, it may be necessary to provide a continuous array of apertures throughout a large region of curved bending to help remove the bent glass sheet from its hugged relation relative to the convex shaped element(s) of a press bending mold.

The form of the invention shown and described in this disclosure represents an illustrative preferred embodiment and certain modifications thereof. It is understood that various changes may be made without departing from the gist of the invention as defined in the claimed subject matter which follows.

What is claimed is:

1. A method of press bending a glass sheet to a curved shape comprising heating said glass sheet to an elevated temperature sufficient for deformation, sandwiching said glass sheet while the latter is supported in a vertical or oblique orientation in pressurized engagement between a pair of press bending molds of complementary convex and concave curvature when said glass sheet is at its deformation temperature to deform said glass sheet to a conforming shape and separating said molds from one another when said deforming is completed, whereby said shaped glass sheet tends to remain in hugging relation to a convexly shaped portion of said separating mold of convex curvature during said separation, characterized by applying vacuum through at least a portion of said mold of concave curvature that faces said convexly shaped portion when said molds separate to apply suction to the major surface of convex curvature of the deformed glass sheet to maintain the deformed glass sheet in said vertical or near vertical orientation as said molds separate.

2. A method as in claim 1, further characterized by initiating said vacuum application substantially simultaneously with the beginning of said separating step.

3. A method as in claim 2, further characterized by suspending said glass sheet from tongs during said sandwiching and separating steps.

4. A method as in claim 2, further characterized by supporting said glass sheet in a near vertical plane along its bottom edge and balancing said glass sheet in an area spaced from said supported bottom edge during said sandwiching and separating steps.

5. A method as in claim 2, further characterized by supporting said glass sheet in an oblique plane along its bottom edge by applying a fluid against the lower edge of said glass sheet to balance the latter during its heating.

6. A method as in claim 2, further characterized by applying a coating to a major surface of said glass sheet and orienting said glass sheet so that said coated major surface engages said press bending mold of convex configuration during said sandwiching step prior to said separating step.

7. A method as in claim 6, further characterized by applying a coating of opaque ink to said major surface.

8. A method as in claim 7, further characterized by applying said coating to a peripheral portion of said major surface.

9. A method as in claim 6, further characterized by applying a coating of electroconductive material to said major surface.

10. A method as in claim 2, further characterized by supporting said glass sheet along its lower edge and balancing said sheet in an oblique plane by applying fluid against the lower surface to balance the latter during its heating.

11. Apparatus for press bending a glass sheet comprising a pair of press bending molds of complementary convex and concave curvature, means to provide relative motion between said molds between a separated position and a glass sheet-engaging position, means to deliver a glass sheet heated to its deformation temperature into a shaping position between said press bending molds when the latter are separated, wherein said means to provide relative motion moves said molds toward one another to engage said glass sheet at deformation temperature to impress their complementary shapes thereon and then to retract, said press bent glass sheet tending to hug said mold of convex curvature during said separation, characterized by aperture means in said concave pressing mold, means for applying vacuum through said aperture means of the concave press bending mold to prevent said glass sheet from sticking to said convex press bending mold when said molds separate from one another after having deformed said glass sheet to its desired shape.

12. Apparatus as in claim 11, comprising means to coordinate the beginning of the application of said vacuum with the beginning of the separation of said shaping molds.

* * * * *